United States Patent
Mauro et al.

[11] Patent Number: 5,419,478
[45] Date of Patent: May 30, 1995

[54] STEERING COLUMN-MOUNTED COOLER

[76] Inventors: Ed Mauro, 536 E. Tarpon Ave., Ste. 5, Tarpon Springs, Fla. 34689; Peter G. Leloq, 1803 Lennox Rd. East, Palm Harbor, Fla. 34683

[21] Appl. No.: 241,245

[22] Filed: May 10, 1994

[51] Int. Cl.⁶ ............................................. B60R 7/00
[52] U.S. Cl. ............................ 224/276; 224/45.45 R; 224/42.45 R; 248/219.1
[58] Field of Search ............... 224/274, 276, 278, 279, 224/30 A, 30 R, 32 R, 35, 36, 45.45 R, 42.45 R, 39; 220/475, 555, 556, 608; 248/219.1, 219.4

[56] References Cited

U.S. PATENT DOCUMENTS

| | | | |
|---|---|---|---|
| 1,532,590 | 4/1925 | Kittelson | 224/278 |
| 1,567,903 | 12/1925 | Bookman | 224/278 |
| 1,637,172 | 7/1927 | Burress | 224/276 |
| 1,834,260 | 12/1931 | Thompson | 224/276 |
| 2,010,877 | 8/1935 | Morell | 224/276 |
| 2,782,971 | 2/1957 | Hershey | 224/278 |
| 3,128,021 | 4/1964 | Habbena | 224/274 |
| 3,156,000 | 11/1964 | Westhoff | 224/274 |
| 4,981,243 | 1/1991 | Rogowski | 224/36 |
| 5,114,060 | 5/1992 | Boyer | 224/32 R |
| 5,152,489 | 10/1992 | Christensen et al. | 224/274 |

FOREIGN PATENT DOCUMENTS

| | | | |
|---|---|---|---|
| 3140525 | 4/1983 | Germany | 224/30 R |
| 8702001 | 4/1987 | WIPO | 224/36 |

*Primary Examiner*—Henry J. Recla
*Assistant Examiner*—Gregory M. Vidovich
*Attorney, Agent, or Firm*—Joseph C. Mason, Jr.; Ronald E. Smith

[57] ABSTRACT

A cooler for beverages and food is mounted on the steering column of a golf cart so that it is easily accessible but does not occupy passenger compartment space. A channel is formed in the front and bottom walls of the cooler to accommodate the steering column. A mounting bracket assembly secured to the steering column includes a pivotally mounted platform that cooperates with the steering column to support the cooler in a horizontal plane. A hook and loop fastener is secured to the platform and to the bottom wall of the cooler so that the cooler may be removed from the cart without disassembly of the mounting bracket assembly.

5 Claims, 3 Drawing Sheets

STEERING COLUMN-MOUNTED COOLER

BACKGROUND OF THE INVENTION

1. Field of the Invention

This invention relates, generally, to coolers for beverages or other food items. More particularly, it relates to a cooler mountable on the steering wheel column of a golf cart or other vehicle.

2. Description of the Prior Art

The typical golf cart is too small to easily accommodate a large, insulated cooler. Accordingly, inventors have looked for ways to mount a cooler on a cart in a way that will not cramp the space of the users of the cart. Perhaps the most successful design heretofore is disclosed in U.S. Pat. No. 4,989,767 to Buschbom. In a first embodiment, it provides a mounting means that mounts a cooler in the passenger compartment of the cart in the dashboard area thereof, and in a second embodiment, it provides a mounting means for mounting a cooler outside the passenger compartment, on the hood of the vehicle. In both embodiments, the cooler is mounted on the passenger side of the vehicle so as not to interfere with the driver.

Although the Bushbom apparatus fulfills its intended function, there is room for improvement because the first embodiment occupies a substantial part of the already-cramped passenger compartment, and the second embodiment positions the cooler at an inconvenient location.

What is needed, then, is a mounting means that positions the cooler inside the passenger compartment but not in such a way as to deprive the passengers of space. At the time the present invention was made, it was not obvious to those of ordinary skill in this art that such outstanding needs existed nor was it perceived how the outstanding needs could be fulfilled.

SUMMARY OF THE INVENTION

The longstanding but heretofore unfulfilled need for a golf cart-mounted cooler that is conveniently positioned for golf cart passengers but which does not occupy needed space within the passenger compartment is now fulfilled.

The novel apparatus is positioned within the passenger compartment and is therefore easily accessible to the passengers. However, it occupies space that heretofore has been wasted.

The insight that made the present invention possible is that the area behind the steering wheel of a golf cart is a rather large space that has never been put to use. If a cooler could be designed that would fit in said area, then the problem of mounting a cooler in a golf cart without cramping the passengers could be solved.

The present invention provides a highly novel cooler that is mountable atop the steering column of a golf cart. It includes a steering column-receiving channel disposed at the angle of the steering column so that a cooler may be disposed in straddling relation to said steering column with the top of the cooler disposed in a horizontal plane. A unique bracket and attachment assembly holds the novel cooler in place.

The primary object of this invention is to provide the world's first golf cart steering column-mounted cooler.

Another important object is to accomplish the primary object in an elegant manner so that the resulting apparatus is easy to manufacture and thus is readily affordable by consumers.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
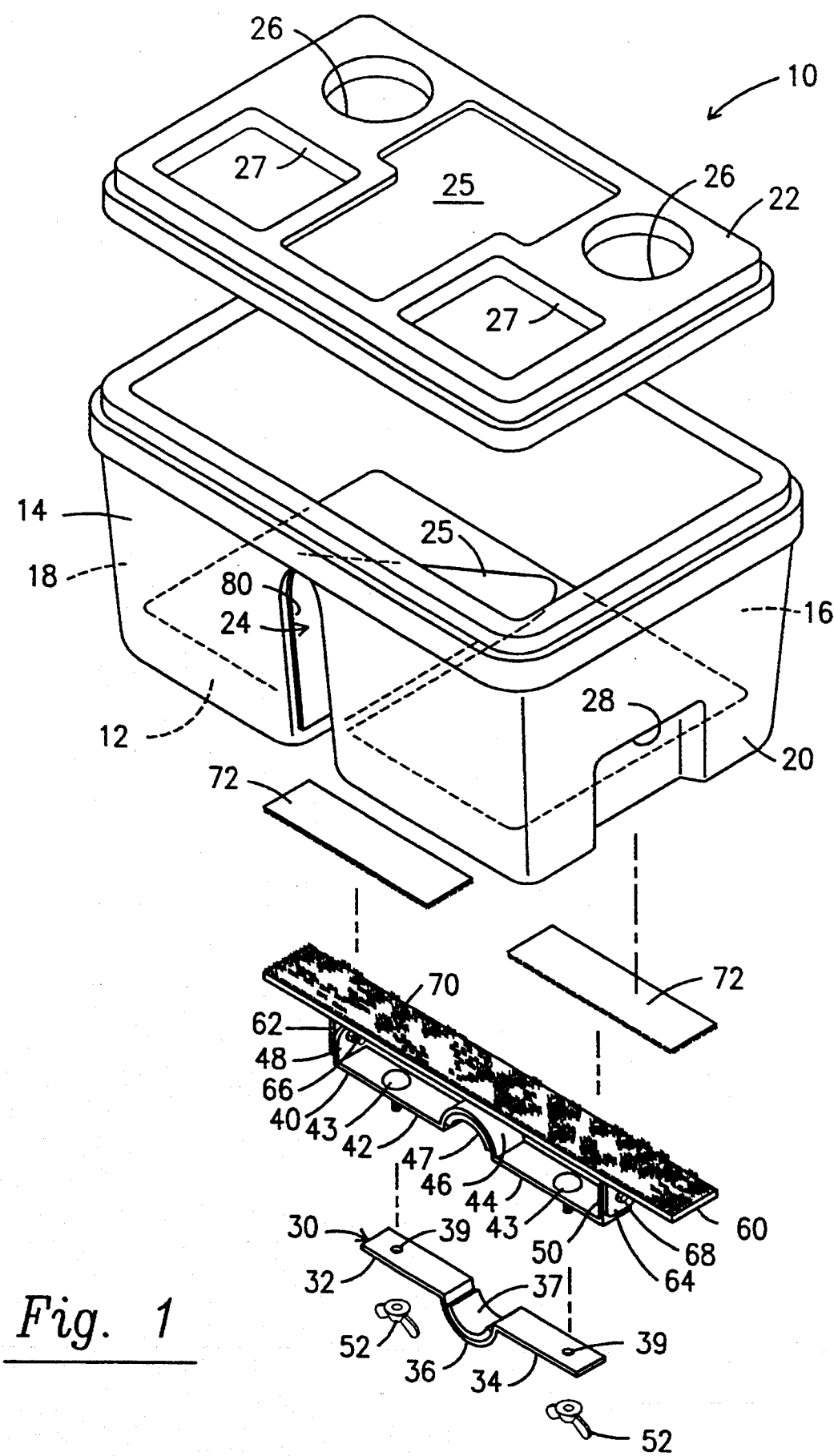
FIG. 1 is an exploded view of the novel cooler.

Referring now to FIG. 1, it will there be seen that an illustrative embodiment of the invention is denoted as a whole by the reference numeral 10.

Cooler 10 has a parallelepiped construction that includes imperforate bottom wall 12, front wall 14, rear wall 16, side walls 18, 20, and removably mounted closure means 22 that surmounts said walls.

Steering wheel-accommodating channel 24 is formed in part in said front wall 14 and in part in said bottom wall 12. In the illustrated embodiment, it bisects front wall 14 and bottom wall 12 so that the cooler may straddle the steering column. Channel 24 is formed in cooler 10 at a predetermined angle relative to the vertical; said angle matches the angle of tilt of a typical golf cart steering wheel column.

Plural circular recesses, collectively denoted 26, are formed in closure means 22 to accommodate beverage glasses and the like so that said glasses will not easily topple over when the cart is driven, and plural square or rectangular recesses 27 accommodate sandwiches or other food items. Recessed area 25 may be used for the placement of advertising indicia.

A pair of undercut hand holds 28, only one of which is shown, are formed in side walls 18, 20.

The novel bracket assembly includes three main parts. The first part is base member 30 which includes a pair of laterally extending arms 32, 34 which are interconnected by a semicircular central part 36. A cushioning means such as pad 37 overlies semicircular central part 36, and a screw-receiving aperture 39 is formed in each arm 32, 34, substantially centrally thereof.

The second main part of the bracket assembly is platform supporting means 40. It includes a pair of laterally extending arms 42, 44 having apertures formed therein; bolts 43, 43 are received within said apertures as shown. Semicircular central part 46 interconnects arms 42, 44, and a cushioning means such as pad 47 overlies said semicircular central part 46. Arms 48, 50 are formed integrally with the respective outermost ends of arms 42, 44, and project therefrom in normal relation thereto as depicted.

The steering column of a golf cart or other vehicle is sandwiched between opposed semicircular parts 36 and 46 when the bracket assembly is completed.

More particularly, arms 42, 44 overlie and align with arms 32, 34 of base 30 and bolts 43, 43 are received within apertures 39, 39 when the bracket is assembled. Wing nuts, collectively denoted 52, or any suitable equivalent, screw threadedly engage their associated bolts 43, 43 to releasably secure base member 30 and platform supporting means 40 to one another to thereby secure the bracket assembly to said steering column.

Figure 2:
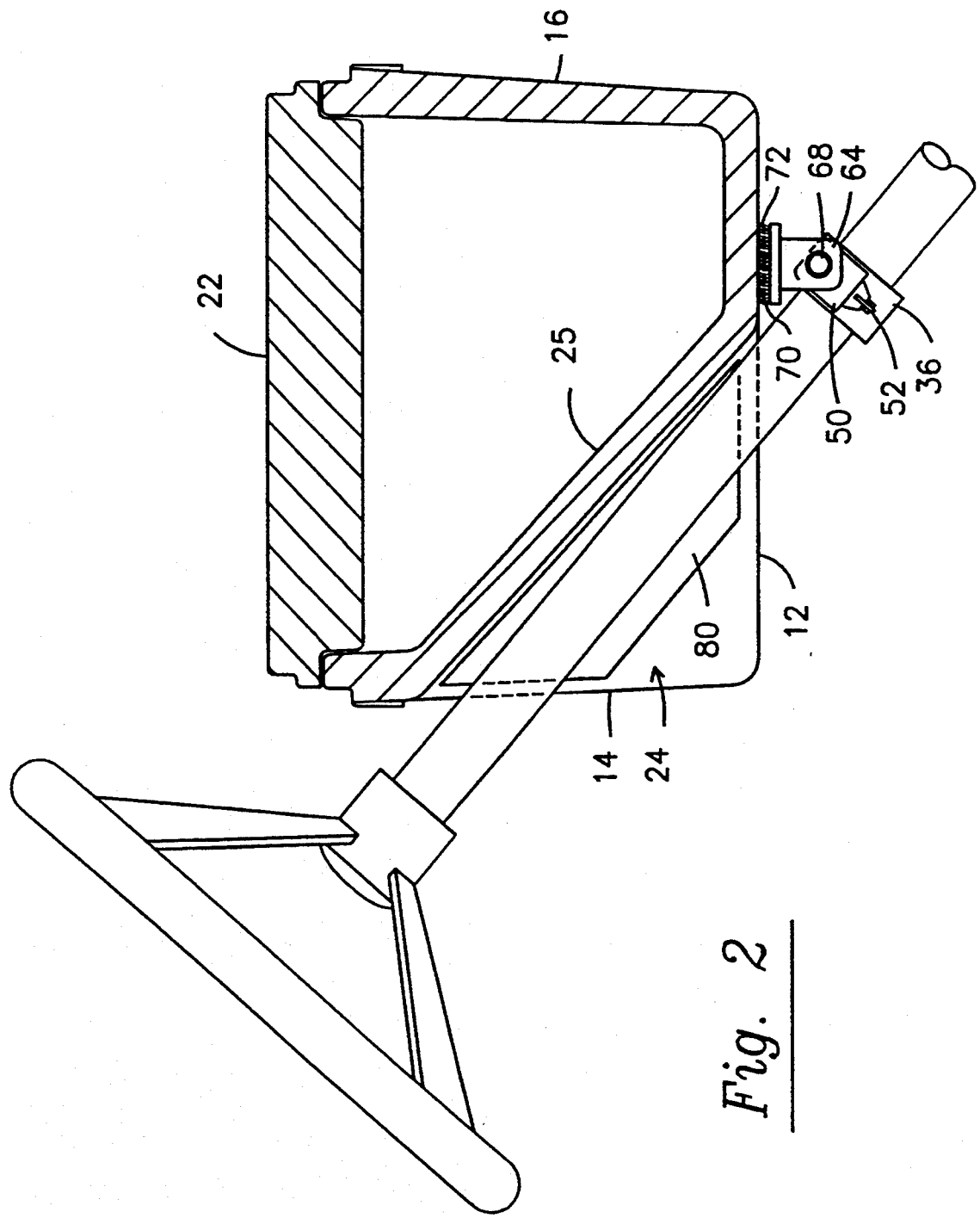
FIG. 2 is a side elevational, partially sectional view of the novel cooler attached to a steering column.

The third main part of the bracket assembly is platform 60; it is a flat wall having depending plates 62, 64 secured thereto in spaced apart relation to one another. The spacing of depending plates 62, 64 is slightly great (or slightly less than) the spacing between arms 48, 50 of platform supporting member 40 so that said plates and arms may be pivotally connected to one another. Specifically, said plates and arms are pivotally connected to one another by pivot pins 66, 68. This pivotal construction enables leveling of platform 60 when the bracket assembly is attached to steering columns of differing inclinations from the vertical as is perhaps best understood in connection with FIG. 2.

A strip of Velcro (trademark) hook and loop fastening means 70 overlies platform 60, and a complementary strip 72 of the same material overlies bottom wall 12 of cooler 10; note in FIG. 1 that strip 72 is in two parts because it is discontinuous at steering column-receiving channel 24. Thus, bringing said strips of material 70 and 72 into mating relation to one another releasably secures cooler 10 to platform 60.

Figure 3:
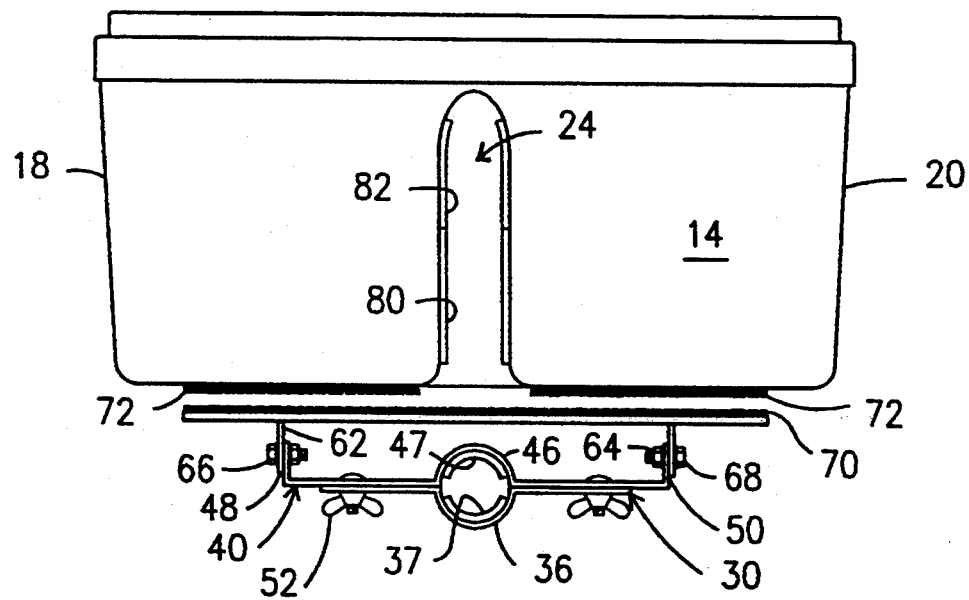
FIG. 3 is a front elevational view of the cooler and its mounting bracket.

FIG. 3 discloses cushion pads 80 and 82 disposed within channel 24.

Cooler 10 may be removed from platform 60 by leaving the bracket assembly in place, by grasping hand holds 28 and pulling the cooler towards the steering wheel. Alternatively, the cooler may be left in attached relation to platform 60, and the bracket assembly may be removed with the cooler so attached.

Figure 4:
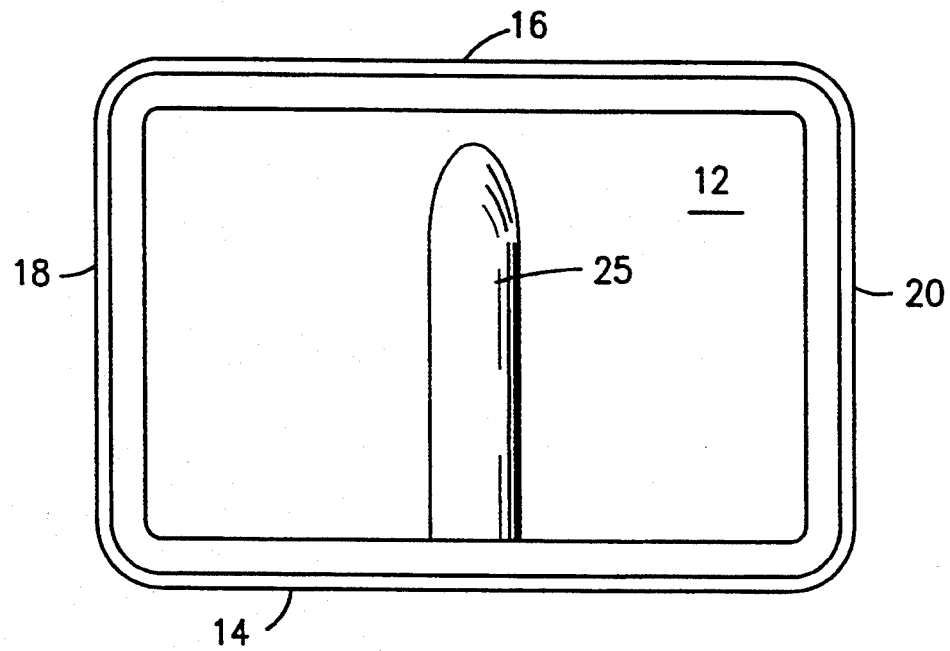
FIG. 4 is a top plan view of the cooler with its closure means removed.

As disclosed in FIG. 4, channel 24 creates an interior partition wall 25. A six pack of a beverage may be positioned on each side of said partition wall 25. FIGS. 1 and 4 indicate that partition wall 25 extends almost to rear wall 16, whereas FIG. 2 seems to depict otherwise. However, it should be understood that partition wall 25 is thick for insulation purposes. Thus, the rear part of wall 25 is close to rear wall 16 of the cooler, but channel 24 extends only about half of the depth of bottom wall 12 as accurately depicted in FIG. 2.

It should be appreciated that containers other than coolers may be mounted to golf cart steering columns in the manner disclosed herein. It should also be appreciated that the invention has application in the environment of any vehicle having an exposed steering column, i.e., its utility is not restricted to golf carts. For example, it could be used on fork lifts and other utility vehicles.

If a golf course has a fleet of carts, it can purchase as many bracket assemblies as it has carts and install one on each cart. However, if only about half the carts are in use at any one time, the course can purchase half as many coolers as carts and interchange them as needed.

The convenient location of the novel cooler enables a user to access it without leaving his or her seat. By occupying the normally wasted space behind the steering wheel, the areas of the cart normally occupied by a conventional cooler become available for other uses. For example, by avoiding the fender mount of the earlier coolers, the fender can be used as a mount for a sand bucket, a sweater basket, a club cleaner, and the like. By avoiding the dashboard mount of earlier coolers, the glove compartment can be used in its intended way to hold various golfing accessories. In other words, unlike the earlier fender and dashboard mounts, the mount disclosed herein does not disable or supplant other capabilities of the golf cart, i.e., unlike the earlier designs, it provides benefits without detriments.

Due to the expense of ownership, many golf courses lease their golf carts; the lessors require that no holes be drilled or other structural modifications be made in said carts by the lessee. The novel mounting assembly has been approved for use on leased golf carts because it requires no holes to be drilled nor does it modify the cart's structure in any way. The cushioning pads also prevent scratching of the steering column. Thus, when the novel cooler and bracket assembly are removed at the end of the lease, the golf cart is returned to its pre-lease condition.

An individual who owns a golf cart will also find the novel assembly useful because the unit can be easily moved from the cart to some other location and then back again as desired. Thus, the unit may be used as a permanent addition to a cart or as a portable unit. This makes it an ideal on the course or off the course item.

The novel bracket may be positioned at any location along the extent of the steering column; this enables it to fit any make of golf cart. The front cowlings of the different makes of golf carts are of different sizes; however, the novel bracket and cooler fits all of them due to the ability of the bracket to be positioned anywhere along the extent of the steering column, and due to the pivotal connection between the bracket and the cooler. The novel assembly also fits golf carts having windshields by sliding the assembly up the steering column. Moreover, a tall golfer may adjust the position of the cooler to provide additional legroom.

The novel mount does not deprive the cart's occupants of use of the dashboard area, nor does it hinder driver or passenger ingress and egress. Significantly, it does not impair the driver's field of vision or restrict vehicle operation in any way.

This invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A container adapted to be mounted on the steering column of a vehicle, comprising:
   said container having a parallelepiped construction;
   said container including a bottom wall, a front wall, a rear wall, and a pair of side walls;

said bottom, front, rear and side walls defining an open-topped container having an interior storage chamber;

a removable closure means for closing said open-topped container;

said vehicle having an exposed steering column, said steering column being disposed at a predetermined angle of inclination relative to a vertical plane;

said container including a steering column-receiving channel formed therein;

said steering column-receiving channel being formed in said container substantially in the center thereof and said steering column-receiving channel substantially bisecting said interior chamber when said container is mounted on said steering column in straddling relation thereto;

said steering column-receiving channel being formed in said front wall and in said bottom wall of said container and extending into said interior chamber at a predetermined angle relative to said vertical plane when said bottom wall of said container is disposed in a substantially parallel relationship to a horizontal plane, said predetermined angle being substantially equal to the predetermined angle of inclination of said steering column; and attachment means for attaching said container to said steering column and for positioning said bottom wall of said container in said substantially parallel relationship to said horizontal plane when so attached.

2. The container of claim 1, wherein said attachment means includes a bracket assembly and wherein said bracket assembly includes an opposed pair of semicircular parts that engage the steering column in sandwiched relation therebetween.

3. The container of claim 2, further comprising a platform for supporting said container bottom wall, and wherein said bracket assembly is connected to and supports said platform.

4. The container of claim 3, wherein said bracket assembly includes a base member having a pair of laterally extending arms interconnected by a first semicircular part of said pair of opposed semicircular parts, a platform support means having a pair of laterally extending arms interconnected by a second semicircular part of said pair of opposed semicircular parts, said platform support means also having a pair of support arms disposed normal to said laterally extending arms, and said platform for supporting said container bottom wall being connected to a distal free end of said support arms.

5. A container adapted to be mounted on the steering column of a vehicle, comprising:

said vehicle having an exposed steering column, said steering column being disposed at a predetermined angle of inclination relative to a vertical plane;

said container including a steering column-receiving channel formed therein;

said container disposed in straddling relation to said steering column, said steering column being received within said channel;

attachment means for attaching said container to said steering column and for positioning said container in a horizontal plane when so attached;

said steering column-receiving channel being formed in said container at a predetermined angle relative to said vertical plane when a bottom wall of said container is disposed in a substantially parallel relationship to said horizontal plane, said predetermined angle being substantially equal to the predetermined angle of inclination of said steering column;

said channel being formed in said container substantially in the center thereof so that said steering column substantially bisects said container when said container is mounted on said steering column in straddling relation thereto;

said container being of parallelepiped construction and including said bottom wall, a front wall, a rear wall, a pair of side walls, and a removable closure means for closing said container;

said channel being formed in said front wall and in said bottom wall of said container;

said attachment means including a bracket assembly and said bracket assembly including an opposed pair of semicircular parts that engage the steering column in sandwiched relation therebetween;

said bracket assembly further including a platform for supporting said container bottom wall;

said bracket assembly including a base member having a pair of laterally extending arms interconnected by a first semicircular part of said pair of opposed semicircular parts, a platform support means having a pair of laterally extending arms interconnected by a second semicircular part of said pair of opposed semicircular parts, said platform support means also having a pair of support arms disposed normal to said laterally extending arms, and said platform for supporting said container bottom wall being connected to a distal free end of said support arms.

* * * * *